US010955565B2

(12) United States Patent
Taguchi et al.

(10) Patent No.: US 10,955,565 B2
(45) Date of Patent: Mar. 23, 2021

(54) RADIATION MEASUREMENT DEVICE AND METHOD

(71) Applicant: MITSUBISHI ELECTRIC CORPORATION, Chiyoda-ku (JP)

(72) Inventors: Masaki Taguchi, Chiyoda-ku (JP); Masateru Hayashi, Chiyoda-ku (JP); Tetsushi Azuma, Chiyoda-ku (JP); Makoto Sasano, Chiyoda-ku (JP); Akihide Shiratsuki, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/478,260

(22) PCT Filed: Dec. 18, 2017

(86) PCT No.: PCT/JP2017/045283
§ 371 (c)(1),
(2) Date: Jul. 16, 2019

(87) PCT Pub. No.: WO2018/185982
PCT Pub. Date: Oct. 11, 2018

(65) Prior Publication Data
US 2020/0225366 A1 Jul. 16, 2020

(30) Foreign Application Priority Data

Apr. 6, 2017 (JP) .............................. JP2017-076010

(51) Int. Cl.
*G01T 1/20* (2006.01)
*G01T 1/105* (2006.01)

(52) U.S. Cl.
CPC ............ *G01T 1/105* (2013.01); *G01T 1/2002* (2013.01); *G01T 1/2006* (2013.01)

(58) Field of Classification Search
CPC ..... G01T 1/105; G01T 1/2002; G01T 1/2006; G01T 3/06; Y02E 30/30; G21C 17/12
See application file for complete search history.

(56) References Cited

U.S. PATENT DOCUMENTS 5,675,151 A * 10/1997 Oka ........................ G01T 1/201
250/366
2003/0057385 A1 * 3/2003 Magne .................... G01T 1/105
250/580

(Continued)

FOREIGN PATENT DOCUMENTS

JP        2-156186 A     6/1990
JP     2001-56381 A     2/2001

(Continued)

OTHER PUBLICATIONS

International Search Report dated Mar. 13, 2018 in PCT/JP2017/045283 filed Dec. 18, 2017.

*Primary Examiner* — Kiho Kim
(74) *Attorney, Agent, or Firm* — Xsensus LLP

(57) ABSTRACT

Provided are a radiation measurement device and method that allow stable radiation measurement as compared with the prior art. The radiation measurement device includes a radiation detection unit 1 having a scintillator, an optical transmission member 21 for transmitting an optical signal generated in the radiation detection unit, and a signal processing unit 3 for calculating a radiation dose from the optical signal transmitted. The signal processing unit includes a compensation unit 7 for obtaining an optical transmission loss amount from a change in wavelength spectrum in the optical signal caused by radiation acting on the optical transmission member and performs compensation-control on the optical transmission loss amount, and outputs a compensated signal.

14 Claims, 8 Drawing Sheets

(56) References Cited

U.S. PATENT DOCUMENTS

| | | | |
|---|---|---|---|
| 2008/0124036 A1* | 5/2008 | Miyabe | G02B 6/03622 385/125 |
| 2009/0140158 A1* | 6/2009 | Clothier | C08K 3/01 250/390.11 |
| 2014/0197321 A1* | 7/2014 | Bendahan | G01T 1/2008 250/366 |

FOREIGN PATENT DOCUMENTS

| | | |
|---|---|---|
| JP | 2006-46996 A | 2/2006 |
| WO | WO 2005/008287 A1 | 1/2005 |

* cited by examiner

| | No. | 450nm | 1270nm | PEAK RATIO |
|---|---|---|---|---|
| LUMINESCENCE INTENSITY | 1 | A0 | B0 | 1.40 |
| | 2 | A1 | B1 | 1.40 |
| | 3 | A2 | B2 | 1.35 |
| | 4 | A3 | B3 | 1.30 |
| | 5 | A4 | B4 | 1.25 |
| | ∫ | ∫ | ∫ | ∫ |

| PEAK RATIO | INTEGRATED RADIATION DOSE | TRANSMISSION LOSS AT SCINTILLATION LUMINESCENCE WAVELENGTH (EXAMPLE) | GAIN COMPENSATION AMOUNT (EXAMPLE) |
|---|---|---|---|
| 1.40 | 0 | 0 | ×1 |
| 1.39 | R(1.39) | 5%(SIGNAL RATIO: 95%) | ×1.05 |
| ∫ | ∫ | ∫ | ∫ |
| 1.35 | R(1.35) | 10%(SIGNAL RATIO: 90%) | ×1.11 |
| ∫ | ∫ | ∫ | ∫ |
| 1.30 | R(1.30) | 20%(SIGNAL RATIO: 80%) | ×1.25 |
| ∫ | ∫ | ∫ | ∫ |

RADIATION MEASUREMENT DEVICE AND METHOD

TECHNICAL FIELD

The present invention relates to a radiation measurement device and method that measure a radiation dose rate in a measurement target field under a high radiation irradiation environment such as within a reactor containment vessel in a nuclear power plant.

BACKGROUND ART

In a reactor containment vessel at a nuclear power plant, a neutron measurement device for monitoring a reactor power and a radiation measurement device for measuring a spatial radiation dose rate are installed. An ionization chamber and a proportional counter have been used so far as detectors of such measurement devices, but output signals from the detectors are easily affected with noise because the output signals are weak electrical signals. Therefore, in order to improve noise resistance, a system that transmits an optical signal using a scintillator or a scintillation fiber as a detector has been developed in recent years.

A means that enables neutron measurement for reactor power monitoring using such optical signal transmission includes a first scintillator that reacts with neutrons, a second scintillator that does not react with neutrons or has a low nuclear reaction probability, and a photodetection unit, whereby the means measures a thermal neutron flux with high accuracy by obtaining a difference between luminescence outputs from the first scintillator and the second scintillator to eliminate an influence of γ rays (see, for example, Patent Document 1).

As another means that uses optical signal transmission in a similar manner, proposed is a multipurpose radiation environment monitoring element for measuring a neutron flux, a γ-ray dose, and a temperature with one sensor under a radiation irradiation environment. Such a monitoring element causes the sensor including OH-added silica pieces to measure an ambient temperature, a neutron flux, and a γ-ray dose, and uses a fluorine-doped optical fiber connected to the sensor as a light guide (see, for example, Patent Document 2).

PRIOR ART DOCUMENTS

Patent Documents

Patent Document 1: WO 2005/008287 A
Patent Document 2: JP 2006-46996 A

SUMMARY OF THE INVENTION

Problems to be Solved by the Invention

In Patent Document 1, in order to measure the thermal neutron flux with high accuracy, the difference between measurement results of two systems is obtained. However, optical transmission characteristics in the light guide are changed when the light guide is irradiated with radiation, so that a problem arises that even when the difference is obtained, variation of a measurement value which is not caused by a change in actual radiation dose occurs.

Further, when the fluorine-doped optical fiber is used as a light guide as in the Patent Document 2, an increase in optical transmission loss caused by radiation irradiation is suppressed. However, when a feeble light such as scintillation light is detected, the measurement value varies even when the change in optical transmission characteristics is small, which causes a problem that in turn makes it difficult to accomplish stable radiation measurement.

The present invention has been made to solve the above-described problems, and an object of the present invention is to provide a radiation measurement device and method that allow stable radiation measurement as compared with before.

Means for Solving the Problems

In order to accomplish the object, the present invention is configured as follows. Namely, there is provided a radiation measurement device comprising:

a radiation detection unit with a scintillator emitting light upon entering of radiation;

an optical transmission member transmitting an optical signal generated in the radiation detection unit; and a signal processing unit configured to obtain a radiation dose from the optical signal transmitted through the optical transmission member, the signal processing unit including a compensation unit configured to obtain an optical transmission loss amount of the optical signal from a change in wavelength spectrum caused by radiation acting on the optical transmission member to perform compensation-control on the optical transmission loss amount, and outputting a compensated signal.

Effects of the Invention

According to the radiation measurement device in one aspect of the present invention, with the configuration where the signal processing unit includes the compensation unit, the wavelength characteristics of the optical signal thus transmitted, specifically, the change in wavelength spectrum, is observed, an amount of change in optical transmission characteristics of the optical transmission member caused by radiation irradiation, that is, the optical transmission loss amount, is obtained, and the amount of change in optical transmission characteristics is compensated. This compensation makes it possible to suppress a fluctuation in radiation measurement value under the radiation irradiation environment as compared with before, perform stable radiation measurement, and ensure reliability of radiation measurement.

EMBODIMENTS OF THE INVENTION

Figure 1:
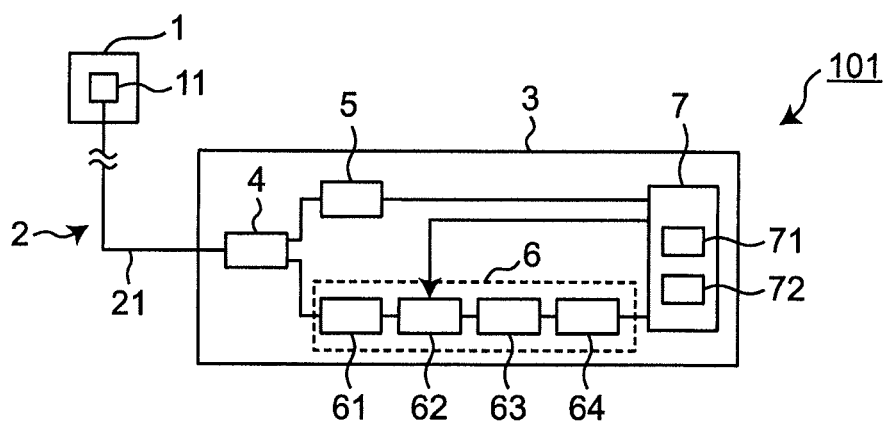
FIG. 1 is a block diagram showing a schematic configuration of a radiation measurement device according to a first embodiment.

A radiation measurement device and a radiation measurement method executed in the radiation measurement device according to each embodiment will be described below with reference to the drawings. In the drawings, the same or similar components are denoted by the same reference numerals. Further, in order to avoid the following description being unnecessarily redundant and to help those skilled in the art to easily understand the following description, detailed description of already well-known matters and redundant description of substantially the same configuration may be omitted. Further, the following description and the accompanying drawings are not intended to limit the subject matter of the claims.

A brief description will be given of the radiation measurement device according to each embodiment to be described below. When an optical transmission member is exposed to a radiation irradiation environment, irradiation-induced luminescence occurs. This irradiation-induced luminescence is considered to originate from Cerenkov light. Wavelength characteristics of the Cerenkov light are observed. Then, it makes use of a change in peak ratio between luminescence peaks at 450 nm and 1270 nm that is caused by an increase of optical transmission loss caused by an increase of integrated radiation dose in the optical transmission member. The integrated radiation dose in the optical transmission member can be obtained from the luminescence peak ratio, and an amount of change in optical transmission characteristics of a wavelength in scintillation luminescence can also be obtained in accordance with the integrated radiation dose. A compensation unit determines a gain compensation amount for a pulse amplifier from, for example, the amount of change in optical transmission characteristics, and controls an amplification factor of an electrical pulse signal. This allows, regardless of the increase of the optical transmission loss in the optical transmission member caused by the increase of the integrated radiation dose, a pulse-height value corresponding to an optical signal generated in a radiation detection unit to be kept constant and allows a peak of a pulse-height spectrum to be kept constant.

First Embodiment

FIG. 1 is a diagram showing a schematic configuration of a radiation measurement device according to a first embodiment. This radiation measurement device 101 includes a radiation detection unit 1, an optical transmission member 21, and a signal processing unit 3 as basic components, the signal processing unit 3 includes a compensation unit 7, and the radiation detection unit 1 and the signal processing unit 3 are connected to each other with the optical transmission member 21 interposed therebetween. The signal processing unit 3 may further include an optical splitting unit 4, a spectral analysis unit 5, and a photodetection unit 6.

In the meantime, when a silica-based optical fiber serving as the optical transmission member 21 is used under a radiation irradiation environment, it is known that the radiation causes a decrease in amount of transmitted light. Specifically, it is known that, in the silica-based optical fiber, when electrons and holes separated by radiation are combined with defects present in the optical fiber, a color center occurs, which causes absorption loss and accordingly deteriorates the optical transmission characteristics.

A radiation measurement device described in each of the following embodiments including the radiation measurement device 101 of the first embodiment is configured to cause the signal processing unit 3 rather than the radiation detection unit 1 and the optical transmission member 21 to compensate for such a deterioration in optical transmission characteristics occurring in the optical transmission member 21.

The above-described components of the radiation measurement device 101 will be described below one by one.

The radiation detection unit 1 includes, as a radiation sensor, a scintillator 11 that emits light upon impinging of radiation. The optical transmission member 21 is a member that is provided in an optical transmission unit 2 and transmits scintillation light (hereinafter, referred to as an optical signal) generated in the scintillator 11 to the signal processing unit 3, and, in the present embodiment, the optical transmission member 21 is an optical fiber.

The signal processing unit 3 is a device that calculates a radiation dose in the radiation detection unit 1 from the optical signal transmitted through the optical transmission member 21.

The compensation unit 7 included in the signal processing unit 3 obtains an optical transmission loss amount in the optical transmission member 21 from a change in wavelength spectrum of the optical signal caused by radiation acting on the optical transmission member 21 and then performs compensation-control on the optical transmission loss amount. The detailed operation will be described later.

The optical splitting unit 4 included in the signal processing unit 3 is connected to the optical transmission member 21 and splits the optical signal transmitted through the optical transmission member 21 into two optical signals in the present embodiment.

The spectral analysis unit 5 is supplied with one of the optical signals that result from the splitting made by the optical splitting unit 4, and, in the present embodiment, observes a luminescence intensity at a specific wavelength in the optical signal, and sends information on the luminescence intensity to the compensation unit 7.

Here, specific devices will be described below for the compensation unit 7, the optical splitting unit 4, and the spectral analysis unit 5, but the present invention is not limited to these devices, and the compensation unit 7, the optical splitting unit 4, and the spectral analysis unit 5 may be any devices as long as the above-described functions and operations are enabled.

The photodetection unit 6 is supplied with the other of the optical signals that result from the splitting made by the optical splitting unit 4, converts the optical signal into an electrical signal, and counts pulses in the electrical signal. The electrical pulse signal thus counted is sent to the compensation unit 7. In the present embodiment, such a photodetection unit 6 includes a photodetection element 61 that converts an optical signal into an electrical pulse signal, a pulse amplifier 62 that amplifies the electrical pulse signal, a pulse-height discriminator 63 that measures a pulse height of the electrical pulse signal thus amplified to discriminate between a signal and a noise, and a counter 64 that counts the electrical pulse signal discriminated as a signal. Here, as the photodetection element 61, an element capable of detecting a weak optical signal to convert the signal into an electrical signal, such as a photodiode, an avalanche photodiode, a photomultiplier, or a multi-pixel photon counter (MPPC) is available.

The compensation unit 7 is electrically connected to the spectral analysis unit 5 and the counter 64 of the photodetection unit 6, and includes a luminescence intensity ratio arithmetic part 71 that obtains a luminescence intensity ratio between specific wavelengths based on the information on luminescence intensity supplied from the spectral analysis unit 5. The compensation unit 7 further includes a storage unit 72 (FIG. 1) that stores information on a relation between the luminescence intensity ratio and an amplification value of the electrical pulse signal. Here, the amplification value corresponds to a gain for the pulse amplifier 62 to amplify the electrical pulse signal.

Such a compensation unit 7 is practically implemented by using a computer, and the luminescence intensity ratio arithmetic part 71 and a subtraction unit 73 to be described later are constituted by software corresponding to arithmetic function and hardware such as a central processing unit (CPU) that executes the software. Note that as a matter of fact, the computer is preferably a microcomputer incorporated in the radiation measurement device 101, but a stand-alone personal computer may be used.

The operation of the radiation measurement device 101 according to the first embodiment configured as described above will be described.

Upon radiation entering on the scintillator 11, the scintillator 11 emits fluorescent light. The fluorescent light is transmitted as the optical signal through the optical transmission member 21 connected to the scintillator 11. The optical signal supplied through the optical transmission member 21 to the optical splitting unit 4 installed in the signal processing unit 3 is split, and one of the resultant optical signals is transmitted to the spectral analysis unit 5.

The spectral analysis unit 5 observes the luminescence intensity at the specific wavelength of the optical signal thus supplied and transmits the result to the compensation unit 7.

The other of the optical signals that result from the splitting made by the optical splitting unit 4 is supplied to the photodetection element 61 included in the photodetection unit 6. The photodetection element 61 converts the optical signal into the electrical pulse signal, and the electrical pulse signal that result from the conversion is amplified by the pulse amplifier 62. Here, the gain for the pulse amplifier 62 is set by a control signal sent from the compensation unit 7. The gain setting will be described in detail below.

Figure 2:
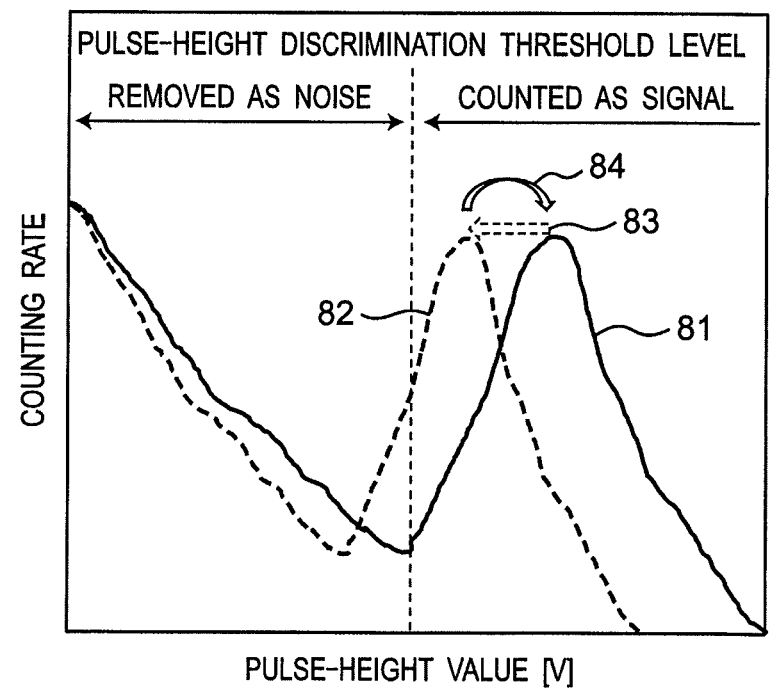
FIG. 2 is a diagram showing a pulse-height spectrum, conceptually showing a decrease of pulse-height value caused by an increase of optical transmission loss in an optical transmission member and compensation thereof, in the radiation measurement device shown in FIG. 1.

In order to discriminate between a signal and a noise in the electrical pulse signal thus amplified, as shown in FIG. 2, the pulse-height discriminator 63 compares a pulse-height value of the electrical pulse signal with a set threshold level to remove an electrical pulse signal that is less than the threshold level and output an electrical pulse signal that is equal to or greater than the threshold level to the counter 64 in the subsequent stage.

The counter 64 counts the electrical pulse signal equal to or greater than the threshold level supplied from the pulse-height discriminator 63 and outputs a count value to the compensation unit 7.

The compensation unit 7 causes the luminescence intensity ratio arithmetic part 71 to obtain the luminescence intensity ratio using luminescence intensities at a plurality of specific wavelengths supplied from the spectral analysis unit 5. Further, the compensation unit 7 reads the amplification value from the storage unit 72 based on the luminescence intensity ratio thus obtained and sends the amplification value to the pulse amplifier 62 as the control signal.

The pulse amplifier 62 amplifies, in accordance with the amplification value, the electrical pulse signal converted from the optical signal by the photodetection element 61.

The operations of the compensation unit 7 and the pulse amplifier 62 will be described in more detail below.

In the radiation measurement device 101 having the above-described configuration and operation, when the optical transmission characteristics in the optical transmission member 21 are deteriorated due to radiation, the following phenomenon occurs.

That is, the deterioration of the optical transmission characteristics in the optical transmission member 21 causes a reduction in the number of photons that reach the signal processing unit 3 among photons generated in the scintillator 11. As shown in FIG. 2, in the photodetection unit 6, the reduction in the number of photons shifts an original pulse-height spectrum 81 of the electrical pulse signal to a pulse-height spectrum 82 (left side of the graph) where the pulse-height value has been reduced due to an increase in optical transmission loss with a reduction amount 83 of the pulse-height value. This causes, in the discrimination operation of the pulse-height discriminator 63, an increase in the number of electrical pulse signals that are less than the threshold level and thus removed, which in turn reduces a radiation measurement value even though a radiation intensity in a measurement target field is not changed.

In order to suppress the above-described variation in radiation measurement value caused by the change in the optical transmission characteristics of the optical transmission member 21, the radiation measurement device according to each of the following embodiments including the first embodiment is configured to obtain the amount of change in the optical transmission characteristics of the optical transmission member 21 and cause the compensation unit 7 to control the gain for the pulse amplifier 62 to compensate for the reduction in the pulse-height value of the electrical pulse signal reduced due to the change in the optical transmission characteristics.

Compensating for the gain of the electrical pulse signal for the pulse amplifier allows, even when the optical transmission characteristics of the optical transmission member 21 changes, the pulse-height value of the electrical pulse signal to be kept constant. That is, it is possible to maintain the pulse-height value (horizontal axis value) constant without a reduction in the pulse-height value given on the horizontal axis (left side of the graph) corresponding to the peak in a counting rate given on the vertical axis in FIG. 2. This makes it possible, in the pulse-height discriminator 63, to prevent or suppress a change in the number of electrical pulse signals identified as signals before and after the change in the optical transmission characteristics.

A method for obtaining the amount of change in the optical transmission characteristics will be described in detail below.

Figure 3:
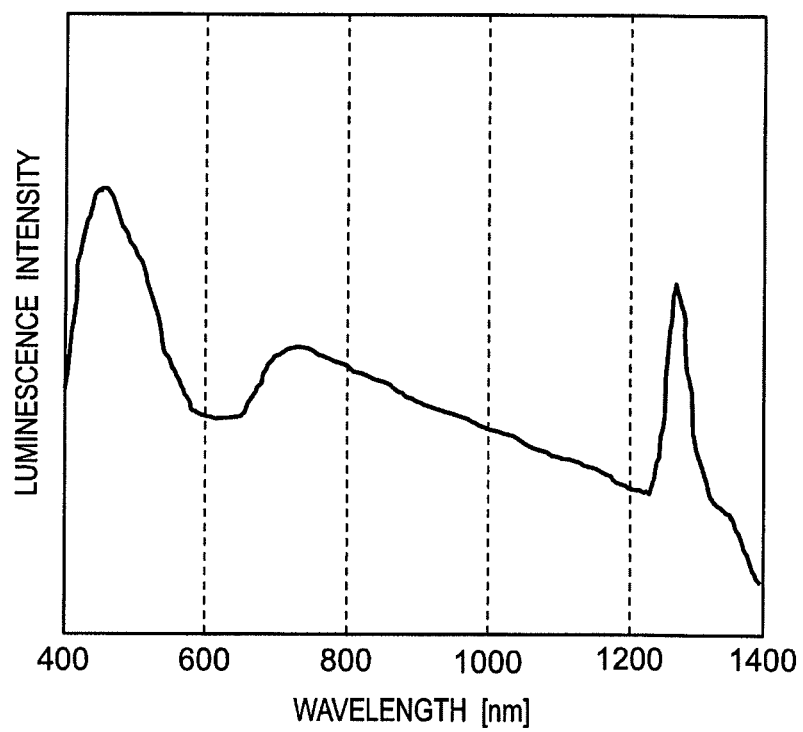
FIG. 3 is a diagram showing a concept of a wavelength spectrum in irradiation-induced luminescence in the optical transmission member in the radiation measurement device shown in FIG. 1.

It is known that when the optical transmission member 21 is exposed to a radiation irradiation environment, irradiation-induced luminescence occurs in the optical transmission member 21. Such irradiation-induced luminescence causes the change in the optical transmission characteristics. This irradiation-induced luminescence is considered to be a luminescence induced by Cerenkov light in the optical transmission member 21, and is observed in a wavelength region of 400 to 1400 nm. This is also described in the Patent Document 2 and a non-patent document (Fusion Engineering and Design 41 (1998) 201-205 "Behavior of optical fibers under heavy irradiation"), and in FIG. 5 in the non-patent document, a wavelength spectrum of observed irradiation-induced luminescence is shown. As shown in FIG. 3 of the present application, the wavelength spectrum of irradiation-induced luminescence has significant luminescence peaks at 450 nm and 1270 nm. Further, it is confirmed that luminescence intensities at the luminescence peaks are proportional to the radiation dose (the above-described non-patent document).

Figure 4:
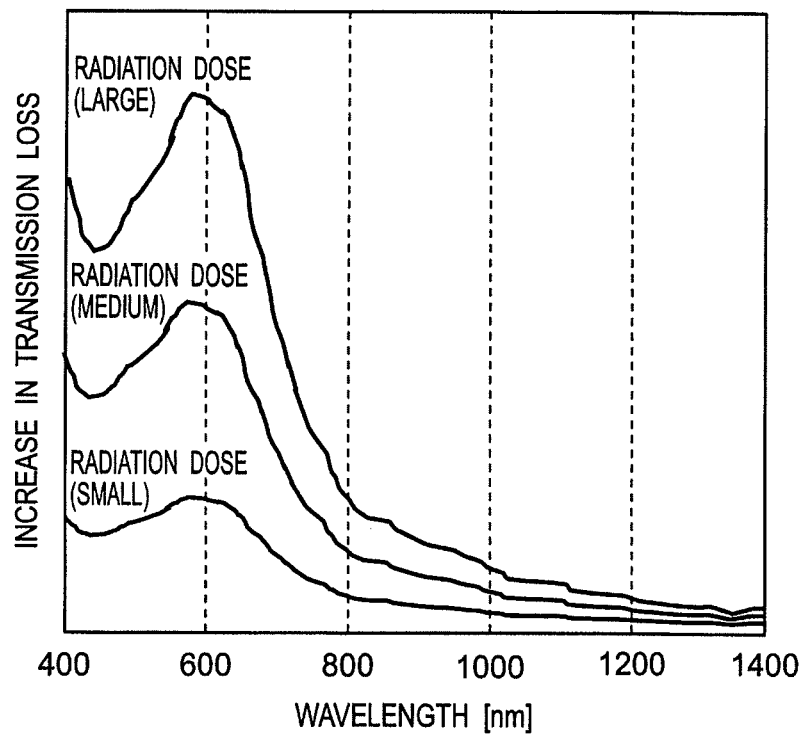
FIG. 4 is a diagram showing a concept of wavelength dependency of an increase of optical transmission loss in the optical transmission member caused by radiation irradiation to the optical transmission member in the radiation measurement device shown in FIG. 1.

On the other hand, the change in the optical transmission characteristics of the optical transmission member 21 caused by radiation irradiation has different characteristics depending on the wavelength, and as shown in FIG. 4, in a visible light region including 450 nm, the increase in optical transmission loss is large, whereas in a near infrared light region including 1270 nm, the increase in optical transmission loss is small.

Therefore, the luminescence intensity ratio between the two luminescence peaks at 450 nm and 1270 nm varies with the change in the optical transmission characteristics of the optical transmission member 21 caused by radiation irradiation. The luminescence wavelength of the scintillator 11 is preferably in a wavelength region not overlapping the luminescence peaks at 450 nm and 1270 nm, and it is desirable that a scintillator having such a wavelength region be selected.

A method for obtaining the amount of change in the optical transmission characteristics will be described with reference to FIG. 5 and FIG. 6.

Figures 5, 6, 7:
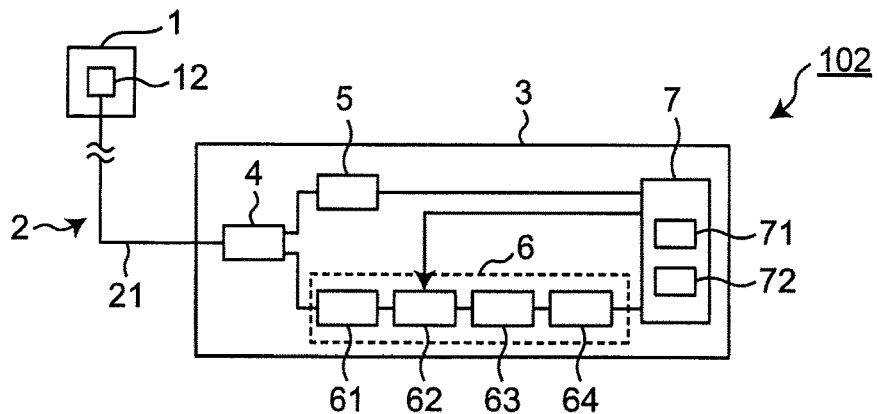
FIG. 5 is a diagram for describing a relation between each luminescence intensity of luminescence peaks at 450 nm and 1270 nm and a luminescence peak ratio with respect to the wavelength dependency of the increase in optical transmission loss.
FIG. 6 is a diagram showing an image of a data table containing data of luminescence peak ratios, integrated radiation doses, optical transmission losses at a scintillation luminescence wavelength, and amplification values stored in a storage unit in a compensation unit included in the radiation measurement device shown in FIG. 1.
FIG. 7 is a block diagram showing a schematic configuration of a radiation measurement device according to a second embodiment.

FIG. 5 is a diagram for describing the luminescence intensity and the luminescence intensity ratio (peak ratio) between the luminescence peaks at 450 nm and 1270 nm. For example, No. 1 in FIG. 5 indicates an initial value under a radiation irradiation environment. No. 2 indicates a case where the luminescence intensity is reduced below the luminescence intensity of No. 1, but the peak ratio is not changed. This means a reduction in radiation intensity in a measurement environment. On the other hand, No. 3 to No. 5 show cases where the peak ratio is changed, showing the change in the optical transmission characteristics caused by radiation irradiation. Here, the peak ratio is a ratio between a luminescence intensity A at 450 nm and a luminescence intensity B at 1270 nm observed by the spectral analysis unit 5 and is a value obtained by dividing the luminescence intensity A by the luminescence intensity B. The luminescence intensity ratio arithmetic part 71 of the compensation unit 7 obtains this ratio.

As described above, the change in the peak ratio is based on the fact that the increase in optical transmission loss caused by radiation irradiation shown in FIG. 4 depends on the wavelength characteristics. Since the increase in optical transmission loss is large at the luminescence peak of 450 nm, while the increase in optical transmission loss is small at 1270 nm, the luminescence peak ratio between the peaks changes as the integrated radiation dose increases.

FIG. 6 shows a data table containing the peak ratio described above and the integrated radiation dose associated with the peak ratio, the amount of change in the optical transmission characteristics at the scintillation luminescence wavelength, and the amplification value (gain compensation amount) used for compensating for the amount of change. It should be noted that each value shown in FIG. 6 is an example used for description, and it is not limited to these values. Further, such a data table is stored in the storage unit 72 provided in the compensation unit 7, and the compensation unit 7 determines the amplification value in accordance with the obtained peak ratio.

Note that the method for obtaining the amplification value is not limited to a method using the data table as in the present embodiment, but the amplification value may be obtained from the amount of change in the optical transmission characteristics using such as an arithmetic expression or a program.

The compensation unit 7 controls the gain for the pulse amplifier 62 based on the amplification value obtained as described above. Controlling the gain changes the amplification amount of the electrical pulse signal in the pulse amplifier 62. Specifically, as shown in FIG. 2, for example, the peak of the pulse-height spectrum can be kept constant by using a compensation amount 84 of the pulse-height value based on the amplification value corresponding to the reduction amount 83. That is, it is possible to cause the pulse-height spectrum 82 in which the pulse-height value is reduced to revert to the original pulse-height spectrum 81.

This makes it possible to suppress the increase in the number of electrical pulse signals to be removed by the pulse-height discriminator 63, and perform stable radiation measurement as compared with before regardless of the change of the optical transmission characteristics in the optical transmission member 21 caused by radiation irradiation to the optical transmission member 21.

Second Embodiment

FIG. 7 is a diagram showing a schematic configuration of a radiation measurement device 102 according to a second embodiment. In the radiation measurement device 102 according to the second embodiment, the radiation detection unit 1 includes, as a sensor, a scintillator 12 having a nuclide that causes a nuclear reaction with neutrons, in place of the scintillator 11 described above. As such a scintillator 12, for example, a Li-glass scintillator, a $LiCaAlF_6$ scintillator, a $CaF_2$ scintillator, or the like can be used. The other configurations are the same as the configurations of the radiation measurement device 101 according to the first embodiment, and the description thereof will be omitted here.

Providing the scintillator 12 causes fluorescent light generated by interaction with neutrons to be processed by the same operation as the operation described in the first embodiment.

The radiation measurement device 102 according to the second embodiment is capable of exhibiting the same effect as in the first embodiment and can be used as a neutron measurement device capable of performing neutron measurement with high detection efficiency for neutrons.

Third Embodiment

Figure 8:
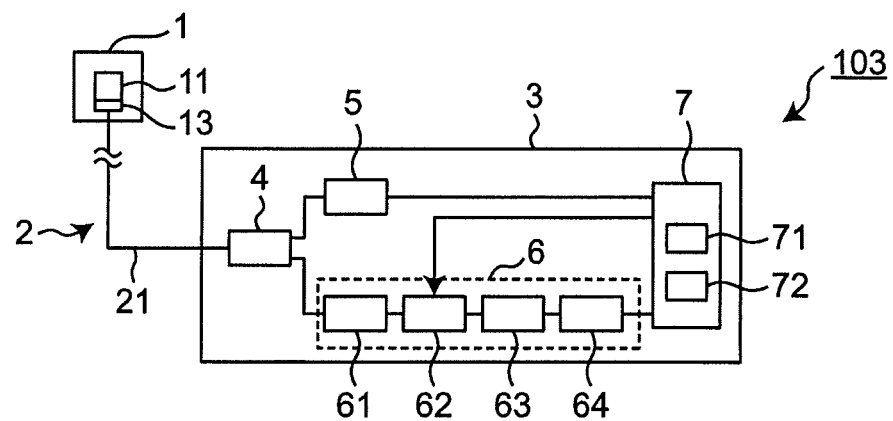
FIG. 8 is a block diagram showing a schematic configuration of a radiation measurement device according to a third embodiment.

FIG. 8 is a diagram showing a schematic configuration of a radiation measurement device 103 according to a third embodiment. The radiation measurement device 103 according to the third embodiment includes, between the scintillator 11 or the scintillator 12 and the optical transmission member 21, a wavelength shifter 13 that converts the luminescence wavelength of the scintillation light. The other configurations are the same as the configurations of the radiation measurement device 101 according to the first embodiment, and the description thereof will be omitted here.

At present, the luminescence peak of scintillation light from a commonly used scintillator is in a range of 400 nm to 600 nm. On the other hand, a wavelength region where the change in the optical transmission characteristics of the silica-based optical fiber serving as the optical transmission member 21 is small is a range of 700 nm or more. Therefore, the wavelength of scintillation light in the range of 400 nm to 600 nm is converted to a wavelength in a range of 700 to 1000 nm by the wavelength shifter 13.

In the radiation measurement device 103 including the wavelength shifter 13, the wavelength of the scintillation light transmitted from the radiation detection unit 1 to the optical transmission member 21 does not overlap the luminescence peak of the irradiation-induced luminescence generated in the optical transmission member 21, and can use a wavelength region where the change in the optical transmission characteristics caused by radiation irradiation is small. Therefore, the amount of compensation for the electrical pulse signal can be reduced. This makes it possible to increase the accuracy and reliability of radiation measurement as compared with conventional radiation measurement.

Fourth Embodiment

Figure 9:
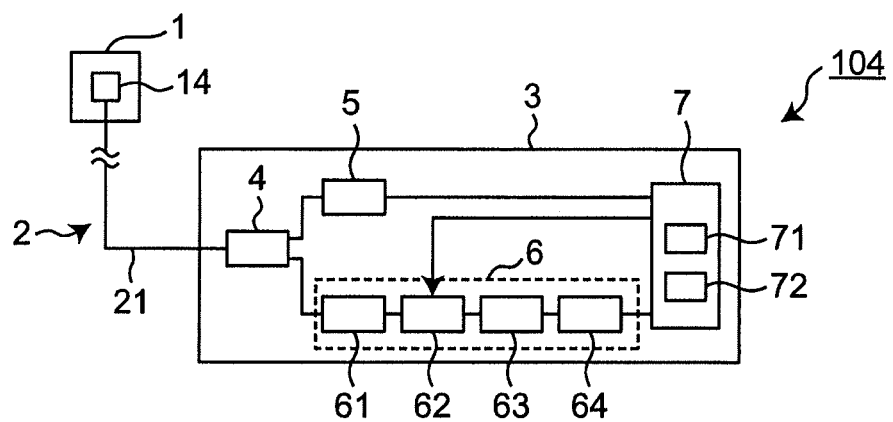
FIG. 9 is a block diagram showing a schematic configuration of a radiation measurement device according to a fourth embodiment.

FIG. 9 is a diagram showing a schematic configuration of a radiation measurement device 104 according to a fourth embodiment. In the radiation measurement device 104 according to the fourth embodiment, the radiation detection unit 1 includes, as a sensor, a scintillator 14 having a luminescence peak wavelength of scintillation light in a range of 700 nm to 1000 nm. As such a scintillator 14, for example, $Y_3Al_5O_{12}$ crystal, $Gd_3(Ga, Al)_5O_{12}$ crystal, or the like can be used. The other configurations are the same as the configurations of the radiation measurement device 101 according to the first embodiment, and the description thereof will be omitted here.

Such a radiation measurement device 104 is capable of exhibiting the same effect that the radiation measurement device 103 of the third embodiment exhibits and suppressing loss in the scintillation light caused by the wavelength shifter 13. This makes it possible to reduce the amount of compensation for the electrical pulse signal and further increase the accuracy and reliability of the radiation measurement as compared with the conventional radiation measurement.

Fifth Embodiment

Figure 10:
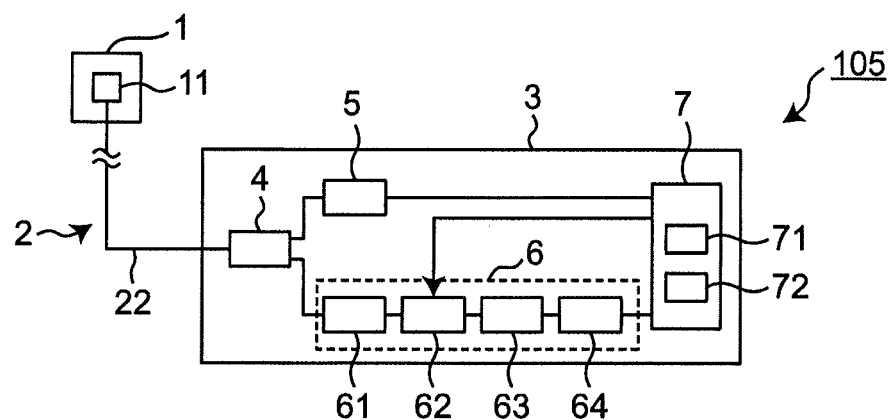
FIG. 10 is a block diagram showing a schematic configuration of a radiation measurement device according to a fifth embodiment.

FIG. 10 is a diagram showing a schematic configuration of a radiation measurement device 105 according to a fifth embodiment. The radiation measurement device 105 according to the fifth embodiment is different from, for example, the radiation measurement device 101 according to the first embodiment in that an optical transmission member 22 that is a fluorine-doped silica fiber doped with fluorine is used in place of the optical transmission member 21. The other configurations are the same as the configurations of the radiation measurement device 101 according to the first embodiment, and the description thereof will be omitted here.

It is known that the optical transmission loss of the silica-based optical fiber under a radiation irradiation environment described above is reduced by the fluorine-doped silica fiber doped with fluorine (for example, JAERI-Tech 2002-019 March 2002, "Research on nuclear reactor instrumentation system using optical technology, JAERI's nuclear research promotion program, H10-041").

Therefore, the radiation measurement device 105 using the optical transmission member 22 that is the fluorine-doped silica fiber doped with fluorine is capable of suppressing the amount of increase in optical transmission loss caused by radiation irradiation and suppressing the reduction in pulse-height value. This makes it possible to suppress the amplification amount of the electrical pulse signal in the pulse amplifier 62, which in turn makes it possible to increase measurement accuracy and reliability.

Sixth Embodiment

Figure 11:
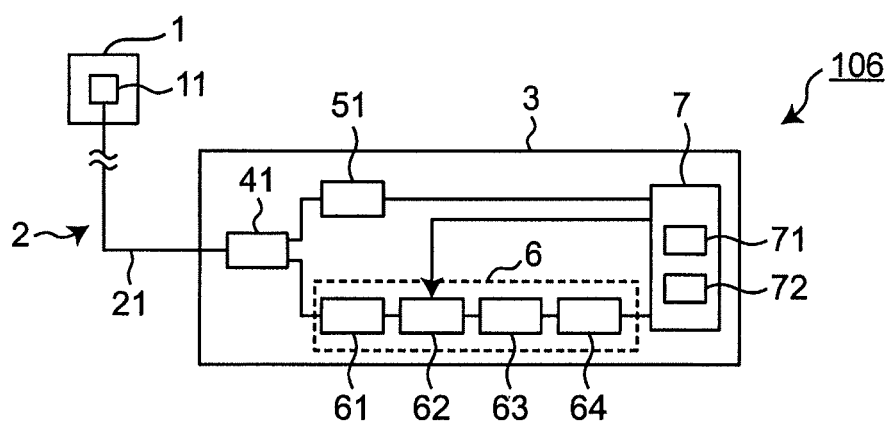
FIG. 11 is a block diagram showing a schematic configuration of a radiation measurement device according to a sixth embodiment.

FIG. 11 is a diagram showing a schematic configuration of a radiation measurement device 106 according to a sixth embodiment. In the radiation measurement device 106 according to the sixth embodiment, the optical splitting unit 4 is constituted by an optical coupler 41, and the spectral analysis unit 5 is constituted by a spectrophotometer 51. The spectrophotometer 51 observes the light wavelength spectrum of one of the optical signals to obtain the amount of change in the optical transmission characteristics from the change in the wavelength spectrum caused by radiation irradiation. The other configurations are the same as the configurations of the radiation measurement device 101 according to the first embodiment, and the description thereof will be omitted here.

In the radiation measurement device 106 according to the sixth embodiment, the spectral analysis unit 5 is constituted by only the spectrophotometer 51, which allows the radiation measurement device 106 to exhibit the same effect that the radiation measurement device 101 according to the first embodiment exhibits with a simple configuration.

Seventh Embodiment

Figure 12:
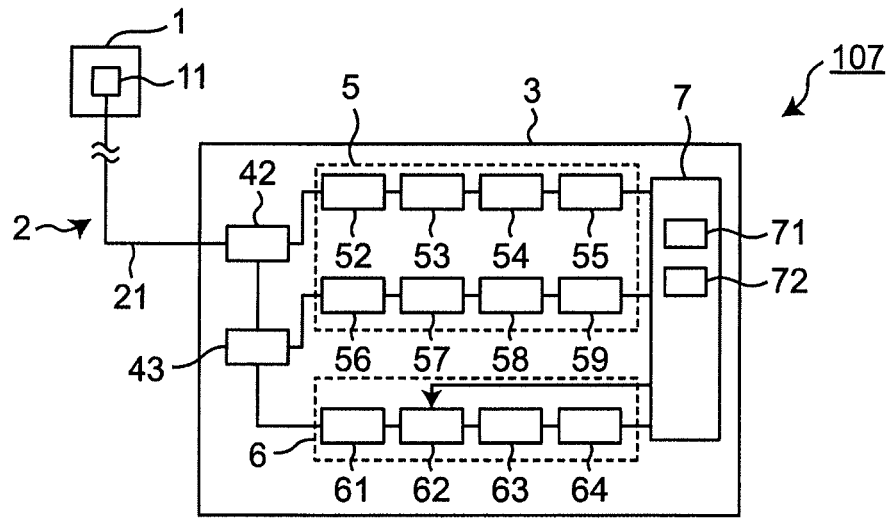
FIG. 12 is a block diagram showing a schematic configuration of a radiation measurement device according to a seventh embodiment.

FIG. 12 is a diagram showing a schematic configuration of a radiation measurement device 107 according to a seventh embodiment. In the radiation measurement device 107 according to the seventh embodiment, the optical splitting unit 4 uses a first color spectral filter 42 and a second color spectral filter 43 that split light in accordance with a wavelength, and the spectral analysis unit 5 has the same configuration that the photodetection unit 6 has. That is, the spectral analysis unit 5 includes a photodetection element 52, a pulse amplifier 53, a pulse-height discriminator 54, a counter 55 for the first color spectral filter 42, and further includes a photodetection element 56, a pulse amplifier 57, a pulse-height discriminator 58, and a counter 59 for the second color spectral filter 43.

Further, the first color spectral filter 42 splits the optical signal supplied through the optical transmission member 21 into light whose wavelength is in a range of less than 500 nm and light whose wavelength is in a range of 500 nm or more. The second color spectral filter 43 splits the light that results from the splitting and whose wavelength is in a range of 500 nm or more into light whose wavelength is in a range from 500 nm or more to less than 1000 nm and light whose wavelength is in a range of 1000 nm or more.

Further, since the spectral wavelength region is set as described above, in the seventh embodiment, the scintillator 11 in which the luminescence peak wavelength of scintillation light is in a range from 500 nm or more to less than 1000 nm is used, or by using the wavelength shifter, it makes the luminescence peak wavelength convert into the above-described wavelength.

In the spectral analysis unit 5, with regard to a peak at 450 nm of the irradiation-induced luminescence peaks in the optical transmission member 21, the light that results from the splitting made by the first color spectral filter 42 and whose wavelength is in a range of less than 500 nm is counted as an electrical pulse signal by the photo detection element 52, the pulse amplifier 53, and the pulse-height discriminator 54, the counter 55, and the count value is sent to the compensation unit 7. This operation is the same as the operation of the photodetection unit 6 according to the first embodiment, and accordingly the description thereof will be omitted here.

Further, with regard to a peak at 1270 nm of the irradiation-induced luminescence peaks, the light that results from the splitting made by the second color spectral filter 43 and whose wavelength is in a range of 1000 nm or more is counted as an electrical pulse signal by the photodetection element 56, the pulse amplifier 57, the pulse-height discriminator 58, and the counter 59, and the count value is sent to the compensation unit 7.

The luminescence intensity at the luminescence peak is proportional to the peak of the pulse-height spectrum described above, and accordingly the compensation unit 7 obtains the amount of change in the optical transmission characteristics from the change in peak of the pulse-height spectrum.

Note that, in the spectral analysis unit 5, in order to confirm the change in peak of the wave height spectrum, gain compensation by the compensation unit 7 is not performed. Therefore, in the pulse amplifier 53 and the pulse amplifier 57 in the spectral analysis unit 5, gain control by the compensation unit 7 is not performed.

With regard to the scintillation light, an optical signal that results from the splitting made by the second color spectral filter 43 and whose wavelength is in a range from 500 nm or more to less than 1000 nm is subjected to counting processing as an electrical pulse signal in the photodetection unit 6 under the same configuration and operation as in the first embodiment.

The radiation measurement device 107 according to the seventh embodiment configured as described above is capable of exhibiting the same effect that the radiation measurement device 101 according to the first embodiment exhibits, and the same configuration can be applied to the spectral analysis unit 5 and the photodetection unit 6, which allows equipment to be standardized and allows a reduction in the number of spare parts.

Eighth Embodiment

Figure 13:
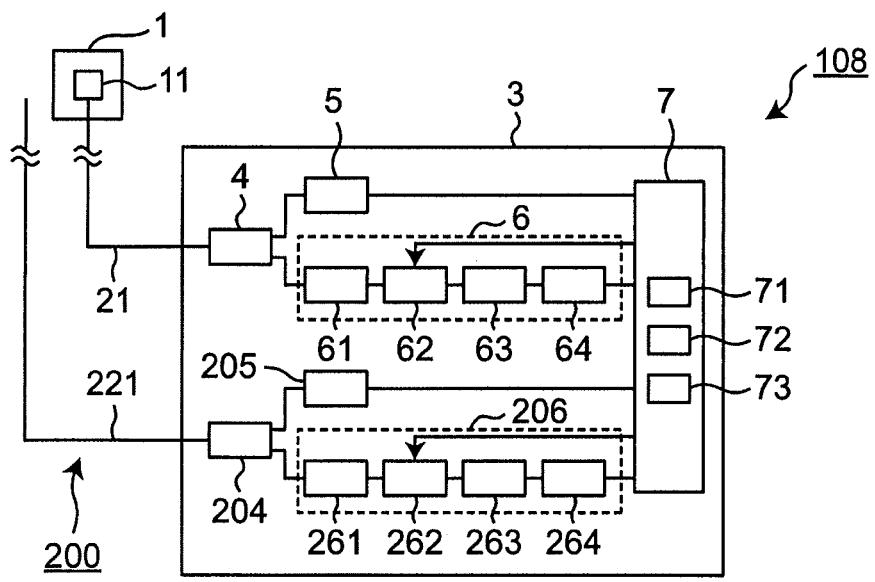
FIG. 13 is a block diagram showing a schematic configuration of a radiation measurement device according to an eighth embodiment.

FIG. 13 is a diagram showing a schematic configuration of a radiation measurement device 108 according to an eighth embodiment. The radiation measurement device 108 according to the eighth embodiment includes, in addition to a system with the radiation detection unit 1 as in the configuration of the first embodiment, a system 200 without the radiation detection unit 1 that is separate from the system with the radiation detection unit 1. In the eighth embodiment, the configuration of the system 200 is applied to the radiation measurement device 101 of the first embodiment, and the configuration of the system 200 is applicable to any of the second to seventh embodiments.

Further, the system 200 without the radiation detection unit 1 includes an optical transmission member for compensation 221 that corresponds to a second optical transmission member and is separate from the optical transmission member 21. An optical splitting unit 204, a spectral analysis unit 205, and a photodetection unit 206, components connected to the optical transmission member for compensation 221, are identical in configuration and operation to the optical splitting unit 4, the spectral analysis unit 5, and the photodetection unit 6 in the radiation measurement device 101, respectively. Note that the photodetection unit 206 includes a photodetection element 261, a pulse amplifier 262, a pulse-height discriminator 263, and a counter 264.

The compensation unit 7 further includes the subtraction unit 73 that performs a subtraction operation to be described below.

In the system with the radiation detection unit 1, as described above, in addition to luminescence caused upon entering of radiation on the scintillator 11, Cherenkov light generated upon entering of radiation on the optical transmission member 21 is generated, both of them are detected as the signal, and the pulse-height discriminator 63 counts the electrical pulse signal equal to or greater than the threshold level. Therefore, the measurement value includes the influence of Cherenkov light that is a noise source.

On the other hand, in the system 200 without the radiation detection unit 1, only Cherenkov light generated upon entering of radiation on the optical transmission member for compensation 221 is detected as a signal, and the pulse-height discriminator 263 counts an electrical pulse signal equal to or greater than the threshold level.

According to such a configuration, a second radiation measurement value obtained by the system 200 without the radiation detection unit 1 is subtracted from the radiation measurement value of the system with the radiation detection unit 1 in the subtraction unit 73 of the compensation unit 7, thereby making it possible to eliminate the influence of Cerenkov light.

Therefore, according to the radiation measurement device 108 of the eighth embodiment, eliminating the influence of Cherenkov light allows only fluorescent light generated in the scintillator 11 to be extracted as a signal, which allows radiation measurement with high accuracy as compared with before.

Ninth Embodiment

Figure 14:
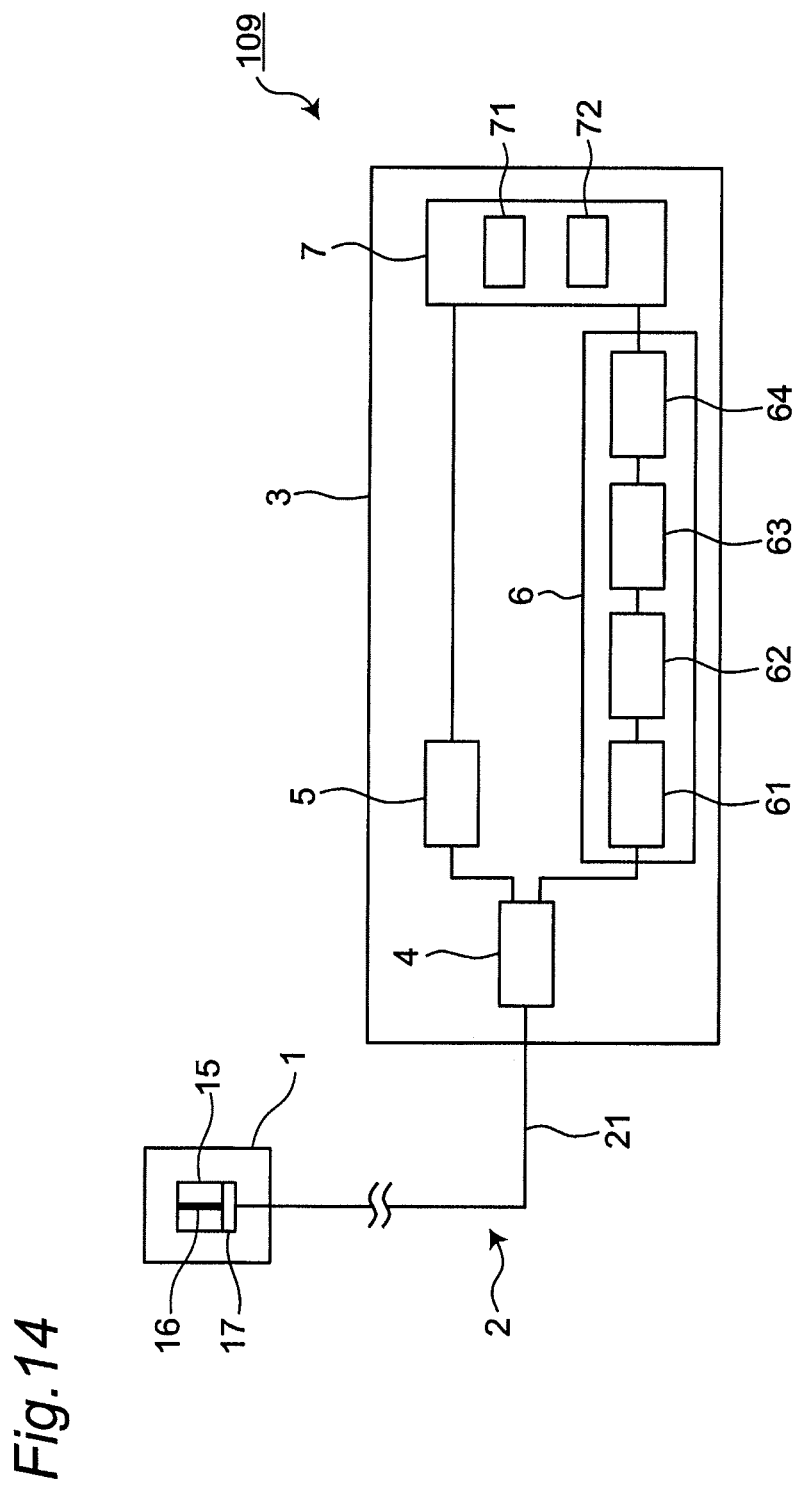
FIG. 14 is a block diagram showing a schematic configuration of a radiation measurement device according to a ninth embodiment.
Figure 15:
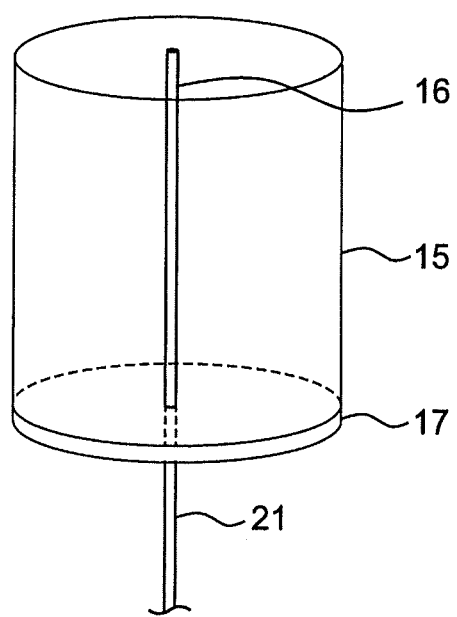
FIG. 15 is an enlarged view of a radiation detection unit and an optical transmission unit shown in FIG. 14.

FIG. 14 is a diagram showing a schematic configuration of a radiation measurement device 109 according to a ninth embodiment. In the radiation measurement device 109 according to the ninth embodiment, the radiation detection unit 1 includes a scintillator 15 as a radiation sensor having a hole extending through the center axis, and, as shown in FIG. 15, includes a wavelength shift fiber 16 extending through the hole in the scintillator 15 with a length identical to the length of the scintillator 15. Furthermore, the radiation detection unit 1 includes, between the scintillator 15 and the wavelength shift fiber 16, and the optical transmission member 21, an optical filter 17 that transmits only light in a luminescence wavelength band passing through the wavelength shift fiber 16. The other configurations are the same as the configurations of the radiation measurement device 101 according to the first embodiment, and the description thereof will be omitted here. Further, the configuration of each of the above-described first, second, and fourth to eighth embodiments is applicable to the radiation measurement device 109.

In the scintillator 15, scintillation light generated by interaction with radiation scatters in all directions from a point where the interaction with the radiation occurs in the scintillator 15. Therefore, in general, only part of the scintillation light generated in the scintillator directly reaches the optical transmission member from the scintillator, and the remaining scintillation light reaches the optical transmission member after being reflected on the surface of the scintillator one or a plurality of times, or disappears in the scintillator or scatters outward and then disappears.

Also in the ninth embodiment, photons are transmitted through the optical transmission member 21, so that only photons that reach an incident surface of the optical transmission member 21, and repeat total reflection within the optical transmission member 21 and then enter on an angle range that allows propagation are transmitted to the signal processing unit 3.

Therefore, when a cross-sectional area perpendicular to the axial direction of the scintillator is larger than an area of the incident surface of the optical transmission member 21, even with radiation having the same energy, the number of photons transmitted through the optical transmission member 21 varies depending on a location in the scintillator where light is emitted, that is, uniformity of light condensing is lowered. This makes a fluctuation in pulse-height value large, which may affect the compensation accuracy in the compensation unit 7.

The radiation measurement device 109 of the present embodiment is configured to reduce or eliminate such a possibility. That is, with the radiation measurement device 109, wavelengths of photons, the photons being generated in the scintillator 15 and passing through the center axis of the scintillator 15 directly or by reflection on the surface of the scintillator 15, are converted on the wavelength shift fiber 16, that is, on the center axis, by the wavelength shift fiber 16 inserted through the center axis, and then the photons become isotropic light. Note that the wavelength shift fiber 16 is a fluorescent optical fiber for wavelength conversion.

Furthermore, in the radiation measurement device 109, providing the optical filter 17 between the wavelength shift fiber 16 and the optical transmission member 21 allows only the luminescence wavelength of the wavelength shift fiber 16 to be transmitted. Since the isotropic light can be generated on an extension line of the axis of the optical transmission member 21, it is possible to suppress the variation in the number of photons of the scintillation light transmitted to the optical transmission member 21 and increase the uniformity of light condensing, without depending on a location in the scintillator 15 where the scintillation light is generated. The increase in the uniformity of light condensing makes it possible to suppress the fluctuation in the pulse-height value with respect to radiation having the same energy. This makes it possible to increase the compensation accuracy, and the measurement accuracy and reliability.

A configuration constituted by a combination of the above-described embodiments may also be employed, and a configuration in which components in different embodiments are combined may be employed.

While the present invention has been fully described in connection with the preferred embodiments with reference to the accompanying drawings, it will be apparent to those skilled in the art that various changes and modifications may be made. Unless such changes and modifications depart from the scope of the present invention as set forth in the accompanying claims, the changes and modifications should be construed as being included within the scope of the present invention.

In addition, the disclosure including the specification, the drawings, the claims, and the abstract of Japanese Patent Application No. 2017-076010, filed on Apr. 6, 2017 is incorporated herein by reference in its entirety.

DESCRIPTION OF REFERENCE SYMBOLS

1 RADIATION DETECTION UNIT
3 SIGNAL PROCESSING UNIT
4 OPTICAL SPLITTING UNIT
5 SPECTRAL ANALYSIS UNIT
6 PHOTODETECTION UNIT
7 COMPENSATION UNIT
13 WAVELENGTH SHIFTER
11, 12, 14, 15 SCINTILLATOR
16 WAVELENGTH SHIFT FIBER
17 OPTICAL FILTER
21, 22 OPTICAL TRANSMISSION MEMBER
41 OPTICAL COUPLER
42 FIRST COLOR SPECTRAL FILTER
43 SECOND COLOR SPECTRAL FILTER
51 SPECTROPHOTOMETER
71 LUMINESCENCE INTENSITY RATIO ARITHMETIC PART
72 STORAGE UNIT
73 SUBTRACTION UNIT
101 to 108 RADIATION MEASUREMENT DEVICE
221 OPTICAL TRANSMISSION MEMBER FOR COMPENSATION

The invention claimed is:
1. A radiation measurement device comprising:
   a radiation detection unit including a scintillator emitting light upon entering of radiation;
   a fiber transmitting an optical signal generated in the radiation detection unit; and
   a signal processing unit configured to obtain a radiation dose from the optical signal transmitted through the fiber,
   the signal processing unit including a compensation circuit configured to obtain an optical transmission loss amount of the optical signal from a change in wavelength spectrum caused by radiation acting on the fiber to perform compensation-control on the optical transmission loss amount, and output a compensated signal.
2. The radiation measurement device according to claim 1, wherein the signal processing unit further includes:
   an optical splitter configured to split the optical signal;

a spectral analysis unit configured to detect a luminescence intensity of the optical signal in order to detect the change in wavelength spectrum of one of optical signals resulting from the splitting to send the luminescence intensity to the compensation circuit; and a photodetection unit configured to convert another of the optical signals resulting from the splitting into an electrical pulse signal to count pulses of the electrical pulse signal, and to send a pulse counted to the compensation circuit.

3. The radiation measurement device according to claim 2, wherein the compensation circuit is configured to obtain a luminescence intensity ratio between specific wavelengths, includes a storage unit in which a relation information between the luminescence intensity ratio and an amplification value of the electrical pulse signal is stored, and is configured to perform amplification-control of the electrical pulse signal on the photodetection unit in accordance with the relation information to compensate for the optical transmission loss amount.

4. The radiation measurement device according to claim 1, wherein the scintillator has a nuclide causing a nuclear reaction with neutrons.

5. The radiation measurement device according to claim 1, wherein the radiation detection unit includes, between the scintillator and the fiber, a wavelength shifter configured to convert a wavelength of light emitted from the scintillator.

6. The radiation measurement device according to claim 1, wherein the radiation detection unit includes a wavelength shift fiber extending through a center axis of the scintillator with a length identical to a length of the scintillator, and an optical filter transmitting light emitted from the wavelength shift fiber between the wavelength shift fiber and the fiber.

7. The radiation measurement device according to claim 1, wherein luminescence peak wavelength of the scintillator is in a range of 700 nm to 1000 nm.

8. The radiation measurement device according to claim 1, wherein the fiber is a fluorine-doped silica fiber.

9. The radiation measurement device according to claim 1, wherein the signal processing unit further includes:
an optical slitter configured to split the optical signal;
a spectral analysis unit configured to detect a luminescence intensity of the optical signal in order to detect the change in wavelength spectrum of one of optical signals resulting from the splitting to send the luminescence intensity to the compensation circuit; and
a photodetection unit configured to convert another of the optical signals resulting from the splitting into an electrical pulse signal to count pulses of the electrical pulse signal, and to send a pulse counted to the compensation circuit,
wherein the optical splitter includes an optical coupler, and the spectral analysis unit is a spectrophotometer.

10. The radiation measurement device according to claim 1, wherein the signal processing unit further includes:
an optical splitter configured to split the optical signal;
a spectral analysis unit configured to detect a luminescence intensity of the optical signal in order to detect the change in wavelength spectrum of one of optical signals resulting from the splitting to send the luminescence intensity to the compensation unit; and a photodetection unit configured to convert another of the optical signals resulting from the splitting into an electrical pulse signal to count pulses of the electrical pulse signal, and to send a pulse counted to the compensation unit,
wherein, the optical splitter includes a color spectral filter and is configured to split the optical signal into optical signals in a plurality of wavelength regions, and
the spectral analysis unit is configured to convert each of the optical signals in the plurality of wavelength regions resulting from the splitting into an electrical pulse signal to detect a change in a corresponding pulse height spectrum.

11. The radiation measurement device according to claim 1, further comprising a second fiber separate from the fiber, wherein the signal processing unit is configured to obtain a second radiation dose from an optical signal transmitted through the second fiber, and subtract the second radiation dose from the radiation dose obtained from the optical signal transmitted through the fiber.

12. A radiation measurement method to be executed in a radiation measurement device configured to obtain a radiation dose from an optical signal transmitted from a scintillator emitting light upon entering of radiation through fiber, the method comprising
obtaining an optical transmission loss amount of the optical signal from a change in wavelength spectrum caused by radiation acting on the fiber with a compensation unit included in the radiation measurement device to compensate for the optical transmission loss amount, and
outputting a compensated radiation dose.

13. A radiation measurement device comprising:
a radiation detection unit with a scintillator emitting light upon entering of radiation;
an optical transmission member transmitting an optical signal generated in the radiation detection unit; and
a signal processing unit configured to obtain a radiation dose from the optical signal transmitted through the optical transmission member,
the signal processing unit including circuitry configured to obtain an optical transmission loss amount of the optical signal from a change in wavelength spectrum caused by radiation acting on the optical transmission member to perform compensation-control on the optical transmission loss amount, and output a compensated signal.

14. The radiation measurement device according to claim 13, wherein the signal processing unit further includes:
an optical splitter configured to split the optical signal;
a spectral analysis unit including a first photodetector and configured to detect a luminescence intensity of the optical signal in order to detect the change in wavelength spectrum of one of optical signals resulting from the splitting to output the luminescence intensity; and
a photodetection unit including a second photodetector and configured to convert another of the optical signals resulting from the splitting into an electrical pulse signal to count pulses of the electrical pulse signal, and to output a pulse counted.

* * * * *